(12) United States Patent
Battlogg et al.

(10) Patent No.: US 11,828,099 B2
(45) Date of Patent: Nov. 28, 2023

(54) DOOR COMPONENT AND METHOD

(71) Applicant: INVENTUS ENGINEERING GMBH, St. Anton I.M. (AT)

(72) Inventors: Stefan Battlogg, St. Anton I.M. (AT); Mathias Brandl, Schruns (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 133 days.

(21) Appl. No.: 17/430,100

(22) PCT Filed: Feb. 11, 2020

(86) PCT No.: PCT/EP2020/053486
§ 371 (c)(1),
(2) Date: Aug. 11, 2021

(87) PCT Pub. No.: WO2020/165179
PCT Pub. Date: Aug. 20, 2020

(65) Prior Publication Data
US 2022/0145689 A1    May 12, 2022

(30) Foreign Application Priority Data

Feb. 11, 2019  (DE) ..................... 10 2019 103 262.8
Jun. 4, 2019   (DE) ..................... 10 2019 115 069.8
Aug. 12, 2019  (DE) ..................... 10 2019 121 640.0

(51) Int. Cl.
*E05F 15/00*    (2015.01)
*E05F 15/73*    (2015.01)
(Continued)

(52) U.S. Cl.
CPC .............. *E05F 15/73* (2015.01); *A61H 3/00* (2013.01); *B60J 5/0468* (2013.01); *B60J 5/0472* (2013.01);
(Continued)

(58) Field of Classification Search
CPC ..... E05F 15/75; E05F 15/00; E05F 2015/767; E05Y 2201/434; E05Y 2201/624;
(Continued)

(56) References Cited

U.S. PATENT DOCUMENTS 5,804,937 A    9/1998  Sasajima et al.
6,799,669 B2  10/2004  Fukumura et al.
(Continued)

FOREIGN PATENT DOCUMENTS

CN    104948061 A    9/2015
CN    109138701 A    1/2019
(Continued)

*Primary Examiner* — Chi Q Nguyen
(74) *Attorney, Agent, or Firm* — Laurence A. Greenberg; Werner H. Stemer; Ralph E. Locher

(57) ABSTRACT

A door component for pivoting a movable door of a motor vehicle has a drive with an electric drive motor in order to influence a pivoting of the door between a closed setting and an open setting. A position measure for an angular setting of the door leaf and a speed parameter for an angular speed of the door leaf are detected by a position sensor. During a pivoting of the door leaf with the speed parameter, an electrical setpoint current intensity for the electric drive motor is ascertained, and an associated setpoint voltage is set. Then the current intensity flowing through the drive motor is ascertained. The setpoint voltage is increased if the current intensity is lower than the electrical setpoint current intensity, and the setpoint voltage is decreased if the current intensity is higher than the electrical setpoint current intensity.

20 Claims, 6 Drawing Sheets

(51) Int. Cl.
    *E05F 15/622* (2015.01)
    *H02P 6/17* (2016.01)
    *H02P 6/28* (2016.01)
    *B60J 5/04* (2006.01)
    *E05F 15/611* (2015.01)
    *E05F 15/75* (2015.01)
    *A61H 3/00* (2006.01)

(52) U.S. Cl.
    CPC .......... *E05F 15/611* (2015.01); *E05F 15/622* (2015.01); *E05F 15/75* (2015.01); *H02P 6/17* (2016.02); *H02P 6/28* (2016.02); *A61H 2201/1215* (2013.01); *A61H 2201/5028* (2013.01); *A61H 2201/5064* (2013.01); *E05F 2015/767* (2015.01); *E05Y 2201/434* (2013.01); *E05Y 2201/624* (2013.01); *E05Y 2201/70* (2013.01); *E05Y 2201/702* (2013.01); *E05Y 2400/21* (2013.01); *E05Y 2400/32* (2013.01); *E05Y 2400/35* (2013.01); *E05Y 2400/36* (2013.01); *E05Y 2400/40* (2013.01); *E05Y 2400/44* (2013.01); *E05Y 2400/86* (2013.01); *E05Y 2900/531* (2013.01)

(58) Field of Classification Search
    CPC .......... E05Y 2201/70; E05Y 2201/702; E05Y 2400/21; E05Y 2400/32; E05Y 2400/35; E05Y 2400/40; E05Y 2400/44; E05Y 2400/86; E05Y 2900/531; E05Y 2400/36; B60J 5/0468; B60J 5/0472; A61H 3/00; A61H 2201/1215; A61H 2201/5028; A61H 2201/5068; A61H 2201/5064
    See application file for complete search history.

(56) References Cited

U.S. PATENT DOCUMENTS

| | | | |
|---|---|---|---|
| 8,508,170 B2* | 8/2013 | Bochen | E05F 15/622 318/362 |
| 9,021,905 B2* | 5/2015 | Reif | F16H 25/2454 74/89.23 |
| 9,677,315 B2 | 6/2017 | Fujimoto et al. | |
| 10,443,289 B2 | 10/2019 | Rrumbullaku et al. | |
| 10,570,656 B2* | 2/2020 | Elie | E05F 15/42 |
| 10,968,667 B2* | 4/2021 | Nottebaum | E05C 17/12 |
| 11,136,807 B2 | 10/2021 | Battlogg | |
| 11,313,167 B2* | 4/2022 | Akbarian | G01S 13/931 |
| 2003/0050151 A1 | 3/2003 | Fukumura et al. | |
| 2008/0222964 A1 | 9/2008 | Longuemare et al. | |
| 2008/0296927 A1* | 12/2008 | Gisler | E05F 15/43 296/146.4 |
| 2015/0275563 A1 | 10/2015 | Fujimoto et al. | |
| 2017/0369016 A1* | 12/2017 | Gurghian | B60W 50/14 |
| 2018/0363359 A1 | 12/2018 | Watanabe et al. | |
| 2019/0301226 A1* | 10/2019 | Kaburaki | E05D 3/127 |
| 2020/0087965 A1 | 3/2020 | Battlogg | |
| 2020/0386034 A1* | 12/2020 | Battlogg | E05F 15/73 |
| 2021/0254388 A1* | 8/2021 | Battlogg | E05F 3/00 |

FOREIGN PATENT DOCUMENTS

| | | |
|---|---|---|
| CN | 109138726 A | 1/2019 |
| DE | 102014012193 A1 | 2/2016 |
| DE | 102017111032 A1 | 11/2018 |
| EP | 1970519 A1 | 9/2008 |
| JP | H09328957 A | 12/1997 |
| JP | H09328961 A | 12/1997 |
| WO | 2018215342 A1 | 11/2018 |

* cited by examiner

DOOR COMPONENT AND METHOD

FIELD AND BACKGROUND OF THE INVENTION

The invention relates to a door component and a method for pivoting a movable door leaf of a door component for a motor vehicle having a drive device with an electric drive motor in order to influence a pivoting of the door leaf at least partially between a closed setting and an open setting.

The door movement of a car door by the driver without assistance (passive mode), and the active door in the case of which an electric motor independently moves the door, exist in the prior art. In the active mode, the door is actively moved by a drive device (electric motor) via, for example, the spindle unit of the damping unit, and no additional force has to be imparted by the user. After the movement command from the user, the movement is then started and stopped by the drive device, and a brake, for example the magnetorheological brake unit, can assist the motor in the braking or blocking in an end position.

In the passive mode, the entire force for moving the door must be imparted by the user. An electric motor, if present at all, does not assist, nor does it consume any electrical current. A for example magnetorheological rotary damper brakes or holds the door in the desired position.

In both modes, the brake apparatus may be equipped with sensors to measure the position and speed of the two connection units relative to one another and in order to detect obstacles in front of the door and to brake the door before collisions or undesired operating states can occur.

SUMMARY OF THE INVENTION

It is the object of the present invention to provide a method and an apparatus with which easy, improved and in particular more comfortable door opening is made possible.

This object is achieved by means of the method having the features as claimed. The apparatus according to the invention is the subject of a further claim. Preferred embodiments and refinements are the subject of the subclaims. Further advantages and features are the subject of the dependent claims.

A method according to the invention serves for the (guided) pivoting of a movable door leaf of a door component for a motor vehicle having a drive device with at least one electric drive motor in order to influence a pivoting of the door leaf at least partially between a closed setting and an open setting, wherein a position measure for an angular setting of the door leaf and a speed parameter for an angular speed of the door leaf are detected by means of at least one position sensor. Here, during a pivoting of the door leaf with the speed parameter, an electrical setpoint current intensity for the electric drive motor is ascertained, and an associated setpoint voltage is set. The current intensity flowing through the drive motor is subsequently ascertained. The setpoint voltage is increased if the current intensity flowing through the drive motor is lower than the electrical setpoint current intensity. The setpoint voltage is reduced if the current intensity flowing through the drive motor is higher than the electrical setpoint current intensity.

The invention has numerous advantages. A significant advantage is that the user has control over the door at all times. The door movement can be "feather-light" practically at all times. The user feels only a very low weight (low moving masses). The door moves almost by itself. Nevertheless, the user is always in control and, for example, does not have to wait for a slow actuating motor. The user specifies the speed.

The invention allows easy, improved and in particular more comfortable door opening with, in particular, the fewest possible cost-increasing additional sensors. It is preferable for existing sensors to be utilized and supplemented by the most cost-effective sensors or measuring methods possible, in order that the overall production costs do not become too high. In particular, it is made possible to dispense with an expensive torque or force sensor in the drive train of the door leaf for detecting the forces on the door.

The "guided mode" differs from the two previously described operating modes (passive; active) from the prior art in that a motor assists the movement desired by the user and thus reduces the expenditure of force by the user. Ideally, the user moves (guides) the door only using the fingertips, and the drive unit and brake in combination attempt to keep the necessary guidance/movement force imparted by the user at a constantly low level.

In simple configurations, the door leaf may be a door device or configured as a door panel connection. In this respect, the expression "door leaf" also encompasses merely a bracket or a connection for a door panel. The door panel or the door structure of the door panel need not be a constituent part of the door component.

The current intensity flowing through the drive motor may also be referred to as the motor current intensity.

Preferably, the current intensity flowing through the drive motor is detected by way of a resistor arranged in series with the drive motor.

The drive motor is preferably arranged in an H-bridge.

In particular, feedback control of the setpoint voltage is performed by means of a proportional-integral controller.

The position measure is preferably taken into consideration in the ascertainment of the electrical setpoint current intensity for the electric drive motor and/or of an associated setpoint voltage.

In particular, a horizontal orientation of the motor vehicle is taken into consideration. In particular, a situation sensor or a location sensor may be used for this purpose. Different forces are encountered on a slope than in a level plane. For example, in hilly San Francisco, forces may differ greatly depending on whether one parks in an uphill or downhill direction. The doors on the right and on the left may also be subjected to different forces in a slope situation.

At least one value for the spatial situation of the motor vehicle is preferably detected by means of a situation sensor. In particular, a value for the current intensity of the drive device is ascertained by means of a current sensor. A stored table preferably contains correction values. The position measure is particularly preferably taken into consideration in the ascertainment of the electrical setpoint current intensity and/or of an electrical setpoint voltage.

A sensor with satellite support such as GPS or GLONASS etc. is preferably used, and map material and online images (image recognition) are taken into consideration. Image recognition refers to a subarea of pattern recognition and image processing. In image recognition, it is sought to segment objects in an image. A symbolic description is assigned to these, but associations between the objects are not searched for in the manner that is conventional in pattern analysis. For this purpose, use may be made of the camera systems that are present or installed in vehicles (for example for parking aids, autonomous driving . . . ), or dedicated cameras may be installed.

A wind sensor may also be used to determine the wind strength.

It is preferred that a measure for an internal resistance to movement is ascertained automatically on demand or at periodic intervals. In this way, the assistance forces required for the normal situation in a level plane can be detected, which are then compensated. Further influences such as the temperature are preferably used in addition in order to adjust the force appropriately.

A recalibration is preferably performed using the measure for the internal resistance to movement.

It is advantageous if hand detection is performed by means of a sensor or by image recognition or by means of a hand sensor, and the drive device is activated only if a hand of a user is situated in the immediate vicinity of the door leaf or touches the latter.

In all configurations, it is preferred that, in the case of a for example manually initiated pivoting of the door leaf, after detection of the movement, a (first) speed parameter is ascertained. A (first) electrical setpoint current intensity for the electric drive motor and an associated (first) setpoint voltage are then ascertained. The (first) setpoint voltage is set. Then, the (first) current intensity flowing through the drive motor is compared with the (first) electrical setpoint current intensity.

If deviations (in particular of greater than 2% or 5%) occur, a (second) setpoint voltage is preferably changed accordingly. The (second) setpoint voltage is set higher if the (first) current intensity flowing through the drive motor is relatively low, and the (second) setpoint voltage is set lower if the flowing (first) current intensity is relatively high. A continuous adaptation of the speed is thus possible.

In particular, a new (second) speed parameter is ascertained periodically (at constant or else variable time intervals). A (second) electrical setpoint current intensity for the electric drive motor and an associated (second) setpoint voltage are then ascertained. The (second) setpoint voltage is set and, if necessary, adapted in a manner dependent on the (second) current intensity flowing through the drive motor.

The setpoint voltage is in each case preferably set in accordance with a time function. The time function is in each case preferably continuous up to the respective setpoint voltage. The profile may be linear. The course may also correspond to a power function or a sine function or be approximated thereby. Several periods or cycles may elapse before the ascertained setpoint voltage is reached.

It is possible and preferred that a cycle for the measurement and setting of the setpoint voltage differs from the interval of the measurement of the current intensity flowing through the drive motor. One complete period may include different numbers of measurements of the current intensity and settings of the setpoint voltage and measurements of the current intensity flowing through the drive motor.

In one preferred configuration, in the case of a method for pivoting a movable door leaf of a door component for a motor vehicle, a drive device having an electric drive motor is used in order to influence a pivoting of the door leaf at least partially between a closed setting and an open setting. Here, a position measure for an angular setting of the door leaf and a speed parameter for a movement speed of the door leaf are detected by means of a position sensor. During a pivoting of the door leaf with a sensor device, at least one electrical variable of the electric drive motor is detected and is taken into consideration in the control of the electric drive motor, such that, for example in the case of an at least partially manually initiated and/or changed pivoting of the door leaf, the electrical variable induced in the drive motor is detected and the drive motor is subsequently actively controlled correspondingly.

Another method according to the invention for pivoting a movable door leaf of a door component for a motor vehicle is carried out by means of a drive device with an electric drive motor in order to influence a pivoting of the door leaf by a user, preferably by a user's hand, at least partially between a closed setting and an open setting.

A position sensor is used to detect a position value for an angular setting of the door leaf, and a situation sensor is used to detect at least one value for the spatial situation of the motor vehicle, and a current sensor is used to ascertain a value for the current intensity of the drive device. A stored table contains correction values. During a pivoting of the door leaf, a control device controls the drive device using the measured values and the correction values stored in the table.

In a preferred refinement, the user can preselect the movement forces in the vehicle menu.

Preferably, the drive device is supplemented by a fast-switching brake device and interacts with this via the control device.

The applicant reserves the right to apply for protection for a further method. Such a method serves for the pivoting of a movable door leaf of a door component of a motor vehicle. Drive is imparted by a drive device with an electric drive motor in order to influence a pivoting of the door leaf by a user, preferably by a user's hand, at least partially between a closed setting and an open setting. Here, a position value for an angular setting of the door leaf is detected by means of a position sensor. A situation sensor is used to detect at least one value for a or the spatial situation of the motor vehicle. A value for the current intensity of the drive device is ascertained by means of a current sensor. A stored table contains correction values, in particular for the spatial situation and/or a position value. During a pivoting of the door leaf, a control device is used, and from these values (spatial situation and/or position value and possibly further values), the door movement is calculated, and the drive device is controlled through variation of the setpoint voltage, in particular is controlled such that the door leaf can be moved by the user with low forces. In particular, the forces are low in relation to the maximum forces that arise during a pivoting. The forces are preferably low in many everyday situations.

An apparatus according to the invention comprises in particular a door component for a vehicle having a drive device with an electric drive motor and with two connection units which are movable relative to one another and which are adjustable relative to one another by means of the drive motor. Here, one of the two connection units is connectable to a support structure and the other of the two connection units is connectable to a movable door leaf in order to influence a movement of the door leaf at least partially between a closed setting and an open setting. A position sensor is included, by means of which a position measure for a setting of the two connection units relative to one another and a speed parameter for a movement speed of the two connection units relative to one another is detectable. The electric drive motor is assigned at least one sensor device by means of which at least a current intensity flowing through the drive motor is detectable. The control device is designed and configured to, during a pivoting of the door leaf with the speed parameter, ascertain an electrical setpoint current intensity for the electric drive motor and set an associated setpoint voltage. The control device is designed and configured to ascertain the current intensity flowing through the drive motor in the presence of the setpoint voltage by means of the sensor device. A comparison device is included, which is designed and configured to compare the current intensity flowing through the drive motor with the setpoint current intensity. The control device is designed and configured to increase the setpoint voltage if the current intensity flowing through the drive motor is lower than the electrical setpoint current intensity and to reduce the setpoint voltage if the current intensity flowing through the drive motor is higher than the electrical setpoint current intensity.

A vehicle is preferably a motor vehicle and in particular a passenger car. It may also take the form of heavy goods vehicles, buses, autonomous vehicles, self-driving taxis or vehicles and off-highway vehicles.

An image recognition system is preferably included, by means of which the near field of the door is (dynamically) detectable.

In particular, the coupling profile is mounted in articulated fashion on both sides and is designed in terms of its shape such that it is always situated (approximately) centrally (in particular with a deviation of less than +/−25%, preferably of less than +/−10%) in the cutout despite the changing kinematic conditions during the movement of the door leaf owing to the mutually spaced-apart connection points or door panel pivot points and the fastening points of the drive unit.

The position sensor (setting sensor) and the sensor device are preferably read out periodically and, in particular, the data are acquired periodically. A data acquisition frequency is in particular >10 Hz and preferably >100 Hz and particularly preferably greater than >1 kHz, and may be or exceed 10 kHz.

The motor current intensity is preferably detected if the position measure for the angular position of the door leaf changes (by a predetermined amount). It is also possible for the motor current intensity to be continuously periodically detected.

In all of the configurations, the control device is preferably assigned at least one memory device.

In particular, at least one table is stored in the memory device. Correction values for different ambient conditions, and also the kinematics of the door (hinge spacings, articulation points . . . ), may be stored in the table or tables. Interpolation of the data in a table is possible. It is also possible for parameters of a function to be stored in the table such that a function or different functions can be used for the adaptation.

A table with situation data (inclination in longitudinal and transverse direction) is preferably present, or calculation rules for inclination angles are stored.

A brake device is preferably included. The brake device is particularly active at least in the end positions or in the presence of angular speeds that exceed a specified value.

At least one situation sensor is preferably included. In particular, at least one angle sensor for detecting an inclination about the longitudinal axis and/or the transverse axis.

In all configurations, it is preferred that the drive device assists the manual force of the user (rotational force) in the direction of rotation.

A fail-safe function is preferably integrated, and the drive motor is disengaged or decoupled in the event of an electrical failure or accident. It will then be easier for children, for example, to open a door in an emergency.

A maximum speed of the door during the opening movement can be limited. It may be possible that a door movement is stopped if, for example in the event of a gust of wind, a hand is no longer in contact with the door.

A controllable brake device is preferably included.

In particular, the brake device is formed as a magnetorheological transmission apparatus and comprises at least one electrical coil.

Preferably, a hand sensor is included, by means of which touching the door leaf by a hand of a user is detectable. In particular, the hand sensor comprises a near field sensor and/or a capacitive sensor.

In all configurations, some or all of the following features may be realized:

The user imparts an initial (starting) and movement impetus to the stationary door, whereupon the drive unit (electric motor) starts up and assists the movement (servo action). It is the intention here for the door to move at the same speed as the guiding hand of the user. The user preferably does not notice any difference between the speed that the user specifies with their movement and the speed at which the motor rotates the door actuator or the spindle in an assisting manner.

If the vehicle is in the horizontal position, this can be performed with less effort. It becomes complex in terms of actuator and control technology if the vehicle is in a lateral inclined position, whereby very different forces arise depending on the direction of movement (for example the door falls, as it were, of its own accord, and the closure requires a high force, and the customer rapidly changes the direction of movement).

Here, the damping unit can be designed in different variants. It may for example be a damper which is designed as a cylinder. The cylinder is divided by a piston into two chambers, which are connected to one another by a damping valve and which contains a magnetorheological fluid as the working medium (patent application WO 2017/081280). Alternatively, use is made of a magnetorheological rotary damper which, by means of a spindle, converts a linear movement into a rotational movement and dampens said rotational movement (patent application DE 10 2017 111 032 A1). The drive device may comprise any desired electric motor which can impart sufficient force to move the two connection units relative to one another.

Further advantages and features of the present invention emerge from the exemplary embodiments, which will be explained below with reference to the accompanying figures.

DETAILED DESCRIPTION OF THE INVENTION

Figure 1:
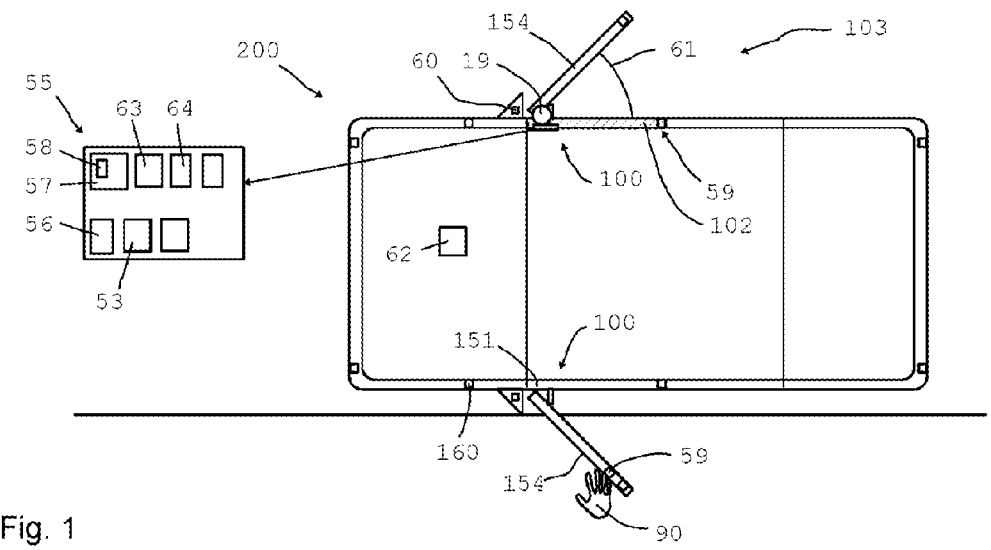
FIG. 1 shows a highly schematic plan view of a motor vehicle having an apparatus with a drivable door with a brake device.

FIG. 1 shows the use of the door component 100 according to the invention on a motor vehicle 200 and in this case on a passenger car. The motor vehicle 200 is illustrated in a schematic plan view from above. Here, two door components 100 designed as doors, each with a door device 154, are provided on the motor vehicle 200. The door devices 154 are formed here as door leaves 104. The doors are both situated in the open setting 103, in this case at an angle 61. Hatching is used to show a door in the closed setting 102.

For the controlled damping of the pivoting movement or for the braking of the pivoting movement of the doors 104 to the point of blocking such movement, the door components 100 each comprise a controllable brake device 1, which is formed as a rotary brake or rotary damper or the like. The door components each comprise connection units 151 and 152, one of which is connected to a support structure of the motor vehicle 200, such as the bodyshell, whilst the other is connected to the door leaf 104 such that, during an opening or closing movement of the door 100, a relative movement of the connection units 151 and 152 takes place. The connection units 151 and 152 move linearly. A conversion into a rotational movement takes place, which is braked or dampened or blocked in a controlled manner by the rotary damper 1 of the door component 100.

The door component 100 comprises the brake device 1 and the connection units 151 and 152 and serves for the guided movement of the doors and thus for targeted acceleration and targeted damping or braking of the rotational movement of the doors (and, if applicable, flaps) on a motor vehicle 200.

The motor vehicle 200 has sensors 160 for scanning the surroundings or for recognition of the surroundings. At least one GPS sensor 63 and/or one situation sensor 62 is included on or in the motor vehicle 200 or on or in the door component 100. It is possible that only one central GPS and/or situation sensor 62 is present. It may be possible by means thereof to determine the present position of the motor vehicle 200. Using the map material present in the motor vehicle or using map material contained in a central memory of the motor vehicle or in the memory device 57, for example, or retrieved online, the present location can be retrieved. It is possible to use this to determine present situation and inclination information for the motor vehicle and the individual door components 100 or to recognize the surroundings by means of image recognition or to optimize the recognition.

Inclination information in the horizontal longitudinal and transverse directions may also be detected directly by means of an inclination sensor 64 or the situation sensor 62. In any case, it is preferably possible to ascertain whether the car is on a slope, and which inclination is present in which direction. It can be derived from this whether the doors are preloaded into the closed or into an open position by the weight force. On an inclined plane, it may also be the case that one (for example the left) side door is preloaded into the closed position and the other (for example the right) side door is preloaded into the open position, depending on the orientation of the motor vehicle on the inclined plane.

A control device 55 serves for controlling the door component 100 with the door leaf 104. The control may also be performed by a central controller of the motor vehicle 200. A central controller may then be provided in the motor vehicle 200 for all door components 100 (and possibly further control tasks).

The control device 55 in this case comprises a proportional-integral controller 53, a comparison device 56, and a memory device 57 with, for example, tables 58 or data stored therein. The control device 55 may comprise a situation sensor 62, a GPS sensor 63 (or any other satellite-based location or positioning system), an inclination sensor 64 and at least one hand sensor 59. Alternatively, at least one of the stated sensors is assigned to the control device 55, or the control device 55 obtains measurement data from such sensors. A current sensor 65 of the sensor arrangement detects the current flowing through drive motor 75 and controls the motor current in a situation-dependent manner with the correction data stored in table 58.

By means of a hand sensor 59, it is for example possible to detect whether a user is touching or gripping the motor vehicle 200 or, in particular, a door. Alternatively, by means of the hand sensor 59, it is possible to detect whether the hand is in the immediate vicinity of the door leaf 104. This may also be performed by means of image recognition. It is possible that a motor-assisted movement is performed only if a hand 90 or a part of the body of the user is in electrically conductive contact with the door leaf 104 or the bodyshell. It is also possible that, for example, a capacitive measurement is performed, and active control of the movement is performed if a hand 90 is situated at a short distance of for example less than 10 cm or preferably less than 5 cm or 2 cm from the door leaf 104. Such a hand sensor may be integrated in the door leaf 104 or other components of the motor vehicle 200.

A position sensor 19 can directly detect the angle of the door. Alternatively, the position sensor 19 detects a position that is representative of the angle of the door. In any case, an angular position of the door can be derived from the position measure 20 (cf. FIG. 9). An angular speed 23 and a speed parameter 22 can be derived from the change in the angular position of the door or of the position measure 20 over time. It is also possible to derive a position measure 20 by means of, for example, sensor devices 60 that are integrated in the exterior mirror or in the bodyshell.

Figure 2:
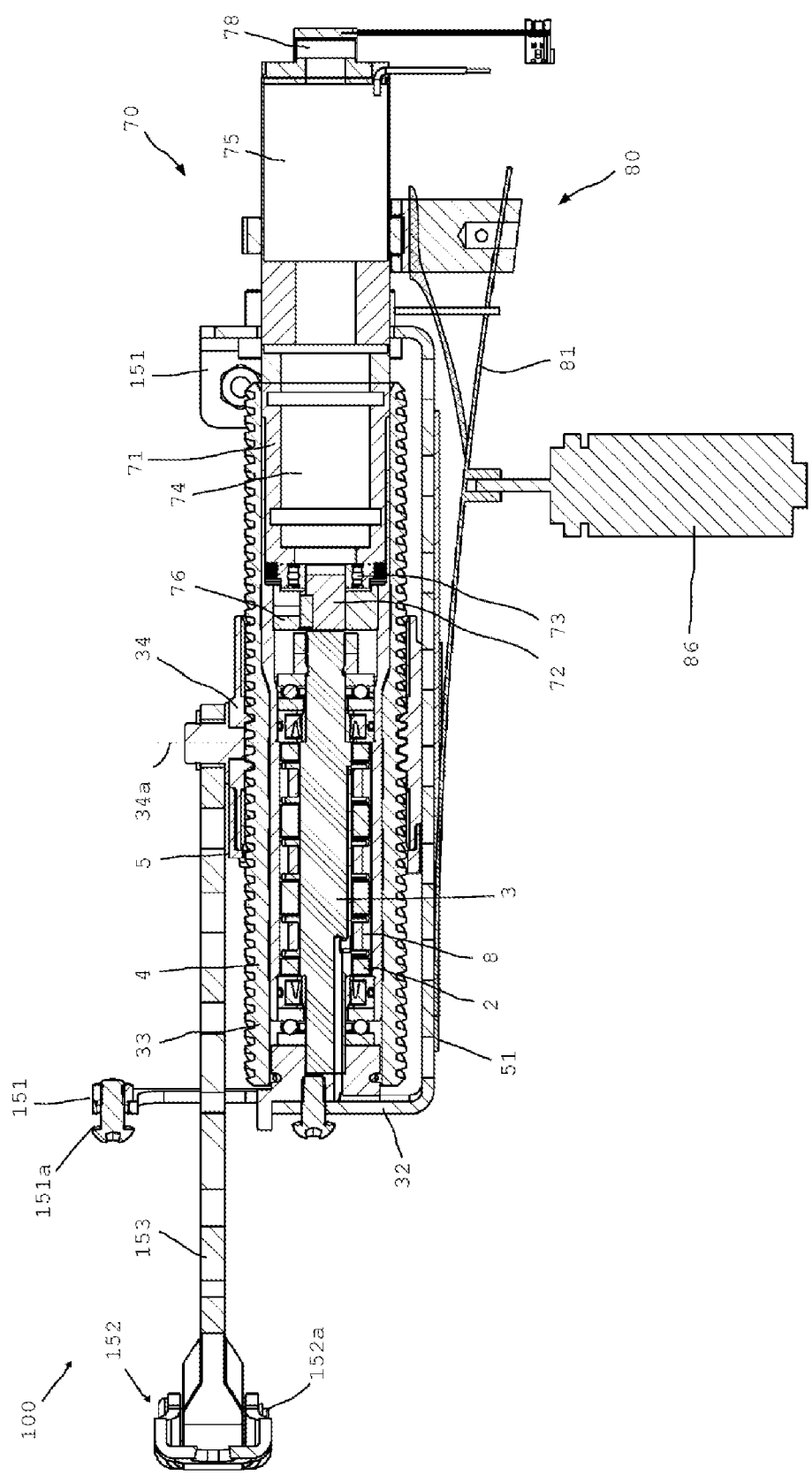
FIG. 2 shows a device with a drive device and a brake device in a schematic section.

FIG. 2 shows an exemplary embodiment in section, wherein, here, a movement influencing device 50 is provided for a door or door component 100. The door component 100 or the movement influencing device 50 comprises connection units 151 and 152 for mounting on a motor vehicle. Here, the first component 32 is for example fixedly connected to the door. A rotary mount 3, formed here as a coupling rod 3, is provided on the first component 32. The second component 33 is mounted rotatably on the rotary mount 3, wherein the second component 33 comprises a threaded spindle 4 on the outside and is thus formed as a spindle unit 4.

A third component 34 is provided, which is formed as a spindle unit 5. The third component 34 is coupled to the second component 33. The spindle unit 5 comprises a spindle nut 5 with an internal thread which meshes with the external thread of the spindle unit 4 of the second component 33. An axial movement of the two connection units 151 and 152 relative to one another is converted into a rotational movement by means of the spindle units 4 and 5 that are in engagement with one another.

A controllable brake device 1 is formed in the interior of the second component 33 for the purposes of braking the rotational movement. The brake device 1 is formed as a controllable rotary brake in order to provide controlled damping of a movement of a door leaf 104 at least partially between a closed setting 102 and an open setting 103. The drive device 70 with the drive motor 75 serves for the controlled movement.

The coupling profile 153 is received on the third component 34 so as to be pivotable about the pivot axis 34a. The pivot axis 34a may for example be formed as a bolt or stub axle on the third component 34 and pivotably receive an eye of the coupling profile 153. Here, the pivot axis 34a lies transversely and in this case perpendicularly with respect to the axis of rotation 33a of the second component 33. The in particular rod-shaped coupling profile 153 is connected at the second end, pivotably about the pivot axis 152a, to the second connection unit 152. The pivot axis 152a may for example also be formed as a bolt or stub axle on the second connection unit 152 and pivotably receive an eye of the coupling profile 153. The coupling profile 153 is pivotably connected at a first end to the third component 34 and at a second end to the second connection unit 152. The second connection unit 152 may for example be attached to or formed on the A-pillar or the B-pillar of the motor vehicle.

For the active control or active guidance of the door, the drive device 70 is received in the second component 33. Here, the drive housing 71 is rotatably mounted on a drive mount 73. A normally rotationally fixed connection between the drive housing 71 of the drive motor 75 and the first component 32 can be eliminated by the actuator 80, which in this case comprises a drive 86. The drive 86 can be moved in a vertical direction and thus eliminate or re-establish a rotationally fixed connection of the drive housing to the first component 32. The actuator 80 is merely optionally provided and, when installed, allows undisrupted and easy pivoting of the door of the motor vehicle in a "manual mode" without motor assistance. In many configurations, the actuator 80 is not included and the drive motor 75 is continuously in a state of engagement.

The first spindle unit 4 is formed on the second component 33. Furthermore, the second spindle unit 5 is formed on a third component 34. The internal toothing of the spindle unit 5, which is formed as a spindle nut, engages into the external toothing of the spindle unit 4 designed as a threaded spindle, such that, during a relative rotational movement of the second component with respect to the third component, an axial displacement of the connection units 151 and 152 relative to one another occurs.

An activation of the drive motor 75 then causes a direct rotation of the two components 32 and 33 relative to one another. Since a threaded spindle 4 is formed on the second component 33, which threaded spindle is in engagement with the threaded nut 5 of the third component 34, an axial displacement of the connection units 151 and 152 with respect to one another is thus effected by means of the motor.

In the decoupled setting, when the actuator 80 is not coupled rotationally fixedly to the drive housing 71, an easy and purely manual adjustment of the angular position of the components 33 and 32 with respect to one another can be effected.

The drive unit does not imperatively need to be arranged coaxially with respect to the brake apparatus 1. Said drive unit may also be arranged parallel or offset with respect thereto. The torque transmission may take place here for example via a V-belt, toothed belt, gear wheels, bevel gear wheels, chain drive, friction wheels or the like. A toothed belt pulley, for example, may be attached to the shaft 72. The component 33 may, at the outer end, have a toothed belt profile, which is then operatively connected by means of a toothed belt to the toothed belt pulley of the movement influencing device 50 or of the drive unit 70.

Figure 3:
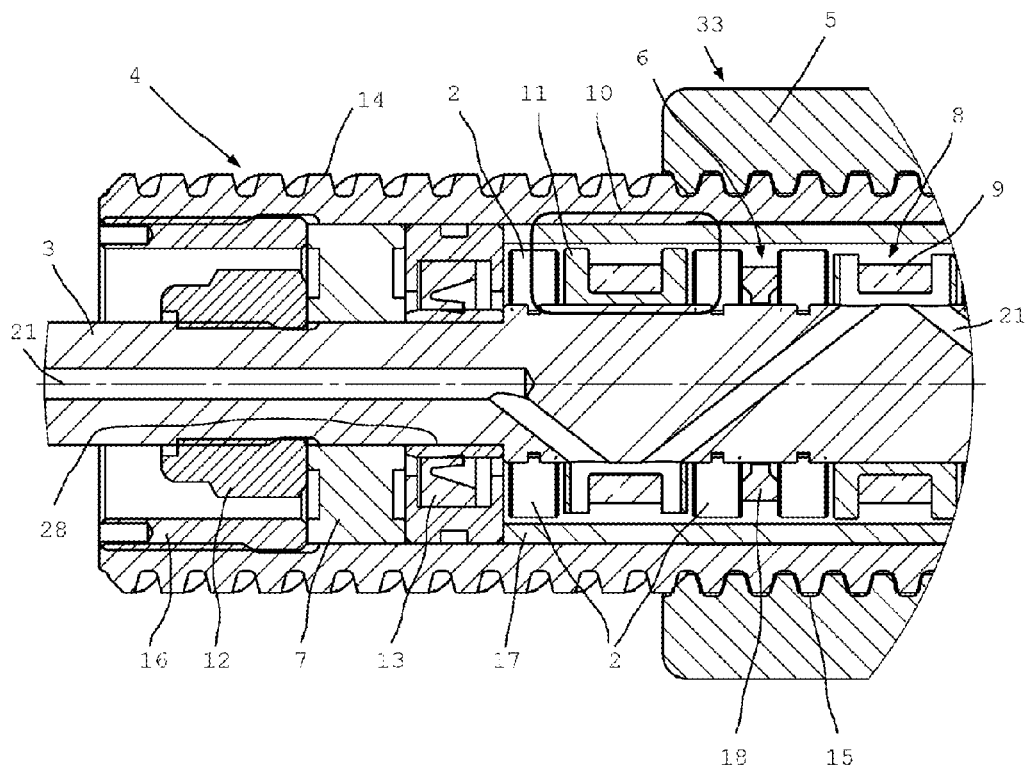
FIG. 3 shows an enlarged schematic detail for apparatuses according to FIG. 2.

FIG. 3 shows an enlarged detail of the movement influencing device 50 with the drive device 70 and the brake device 1. Of the three components 32, 33 and 34, the first component 32 is connected to the bodyshell of the motor vehicle 200, and the second component 33 is connected or coupled to the door leaf 104. The second component 33 is rotatably mounted by way of the rotary mount 3, which is formed here as an axle unit. Bearings 7 are arranged between the axle unit 3, which can also be referred to as a coupling rod, and the second component 33. Between the bearings 7, there are arranged electrical coils 9, each of which is adjoined in an axial direction by rotary bodies 2. With the electrical coils 9, a magnetic field source 8 is provided. If a magnetic field is generated by means of the electrical coils 9, this leads to a braking torque between the two components 32 and 33. An intense braking moment can be applied by means of the brake device 1 in any angular positions, such that an unintentional change of the opening angle of the door leaf 104 is prevented.

FIG. 3 also shows, by way of example, the course of the magnetic field 10 or field lines of a magnetic circuit.

The magnetic field generated by the electrical coil 9 as magnetic field source 8 runs through a section of the magnetically conductive sleeve 17 and passes through a rotary body 2 arranged adjacent to the electrical coil and enters the coupling rod or rotary mount 3, which is composed of a likewise ferromagnetic material, and runs axially back to the next rotary body 2, where the magnetic field lines again pass radially through a rotary body 2 and enter the sleeve 17 and are closed there. It is preferable for two separate rotary bodies 2 to be provided between two axially adjacent coils.

Several magnetic circuits may be provided which are axially spaced apart from one another. Each magnetic circuit may for example comprise two rows of rotary bodies 2, which are arranged in each case to the right and left of an electrical coil 9 in a manner distributed around the circumference. The following applies here: the more magnetic circuits/rotary body units are implemented, the higher the maximum braking torque.

It is also possible that rotary bodies which are elongate in an axial direction are provided, such that one end of an elongate cylindrical rotary body is passed through by the magnetic field of the electrical coil 9 adjacent on one axial side, whereas the other end of the cylindrical rotary body 2 is passed through by the magnetic field of the next electrical coil 9.

Centrally in the interior of the coupling rod 3 or of the rotary mount 3, there may be formed a channel 21 which comprises, for example, branching channels that run for example to the individual electrical coils 9 in order to supply current to the individual electrical coils 9 in a targeted manner.

The coupling rod or rotary mount 3 is in particular fixedly connected to the first component 32 and may optionally be formed integrally thereon or else screwed or welded thereto.

It is possible that intermediate rings 18 are provided in each case between the individual series of rotary bodies 2 in order to separate the individual magnetic circuits from one another.

The external thread 14 of the threaded spindle 4, which is in engagement with the internal thread 15 of the spindle nut 5, can also be clearly seen in FIG. 3.

The sleeve 17 is connected, and for example adhesively bonded, rotationally conjointly to the threaded spindle 4 as a second component 33. The use of a sleeve 17 composed of a ferromagnetic material makes it possible to produce the threaded spindle 4 itself for example from a plastic, wherein the use of special plastics is advantageous here. This leads to a considerable weight saving. Furthermore, self-lubrication of the inter-engaging thread regions of the spindle units 4 and 5 can be achieved, such that the door component 100 can be operated without maintenance and with low friction.

A seal 13 is arranged adjacent to the rolling bearing 7, which seal comprises, for example, a shaft sealing ring and seals all gaps by way of contact. Since the rotary mount 3 is preferably composed of a ferromagnetic material and is composed for example of a relatively soft steel, a race 28 composed of a hardened material is preferably applied to the rotary mount 3 in the region of the seal 13 in order to prevent wear.

In the interior, a multiplicity of magnetic circuits is preferably accommodated in the cavity between the rotary mount 3 and the sleeve 17 (if the threaded spindle is composed for example of plastic) or the inner wall of the threaded spindle 4 (if this is composed of a ferromagnetic material and no sleeve 17 is provided) and the outer surface of the rotary mount 3. In this case, in the hollow cylindrical interior, electrical coils 9 are either wound directly onto the rotary mount 3 or are wound onto coil holders 11, which are subsequently pushed onto the coupling rod 3.

A multiplicity of rotary bodies or rolling bodies 2, through which the magnetic field of the magnetic circuit is closed, are preferably accommodated on each axial side adjacent to the electrical coils 9. For example, in one axial position, for example 8 or 10 rotary bodies 2 may be arranged in a manner distributed around the circumference.

Figure 4:
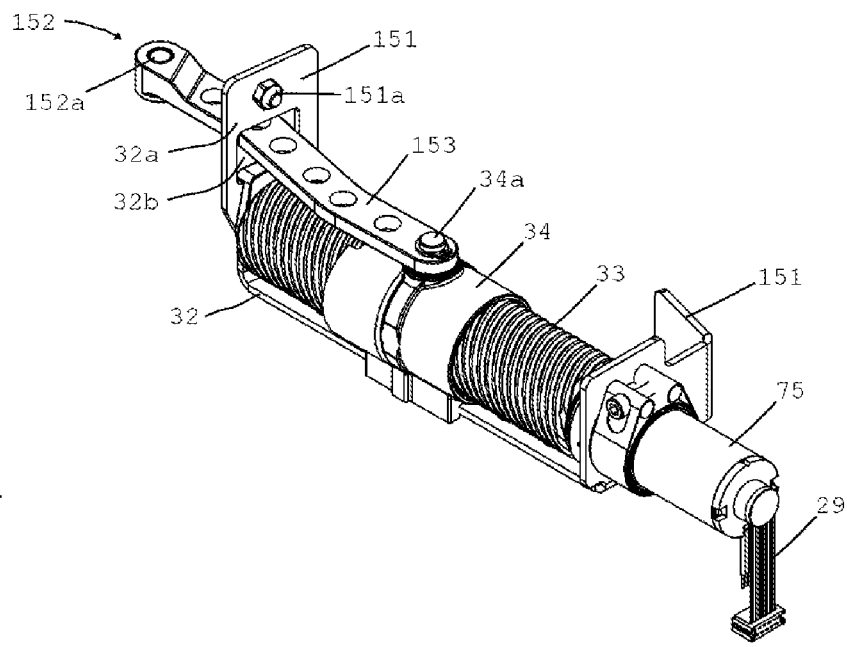
FIG. 4 shows a perspective illustration of the apparatus according to FIG. 2 in a central position.
Figure 5:
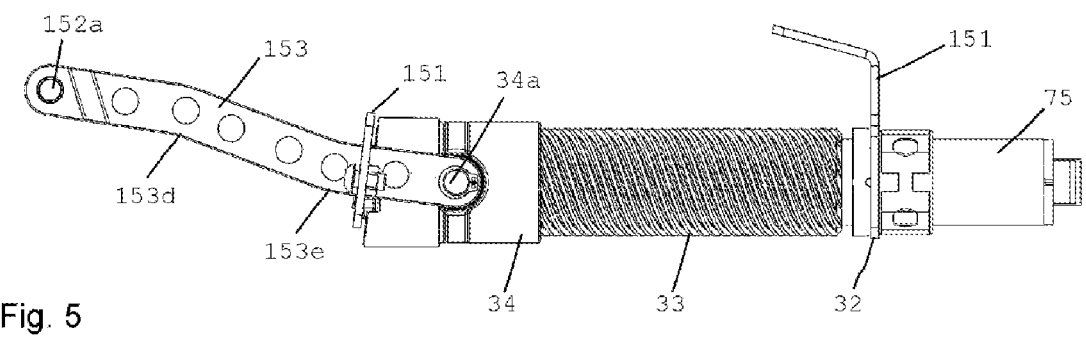
FIG. 5 shows a plan view of the apparatus according to FIG. 2 in an extended position.
Figure 6:
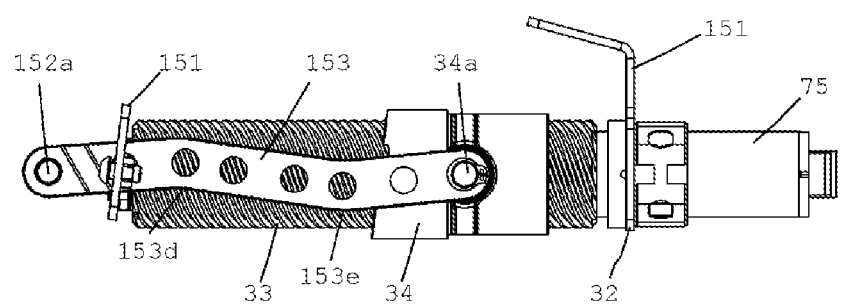
FIG. 6 shows a plan view of the apparatus according to FIG. 2 in a retracted position.

FIG. 4 to FIG. 6 show different settings of the movement influencing device 50 according to FIG. 2. FIG. 4 shows the movement influencing device 50 in a central position in which the spindle nut 5 is situated in an intermediate position. The coupling profile 153, which can be seen here in perspective and is of elongate form, extends a medium distance through the cutout 32b on the plate or guide plate 32b. The guide plate 32b is fixedly connected to the first component 32 and in particular formed integrally thereon.

It can be seen that the cutout 32b is only slightly wider than the coupling profile 153. The illustrated design allows a very narrow construction in the case of which the clear width can be smaller than twice the width of the coupling profile 153 perpendicular to its longitudinal extent. This is achieved in that the coupling profile 153 is mounted in articulated fashion on both sides and is designed in terms of its shape such that it is always situated centrally in the cutout 32b despite the changing kinematic conditions during the movement of the door leaf owing to the mutually spaced-apart connection points or door panel pivot points and fastening points 152a of the drive unit.

The first component 32 may be composed substantially of a bent or folded plate and be screwed directly to a door leaf 104 by means of screws 151a, for example. In particular, the apparatus is installed in the interior of the door or in the interior of a door structure of the door leaf 104.

FIG. 5 shows a plan view of a fully extended coupling profile 153. The device is situated in the extended end setting and the coupling profile 153 extends to a maximum extent through the cutout 32b. In the plan view according to FIG. 6, it can be clearly seen that the coupling profile 153 has multiple, and in this case two, curvatures 153d and 153e which run in this case in opposite directions. As a result, the ends of the coupling profile 153 extend parallel to one another and are arranged so as to be offset by less than a width transverse to the longitudinal extent. The exact profile shape is dependent on the installation situation. Here, in any case, a narrow structure is achieved which, even during operation, has only a small space requirement for installation into the interior of a door leaf.

FIG. 6 shows a plan view of the movement influencing device 50 according to FIG. 2 in a substantially retracted position. The coupling profile 153 is substantially retracted and does not extend laterally beyond the diameter of the second component 33 or of the third component 34.

As FIGS. 4, 5 and 6 show, a guide plate 32a for fastening to a door leaf 104 is fastened to the first component 32. The guide plate 32a comprises a cutout 32b through which the coupling profile 153 is led. The coupling profile 153 is pivotably coupled to the third component 34 and the second connection unit 152 and is of elongate and curved form.

Figure 7:
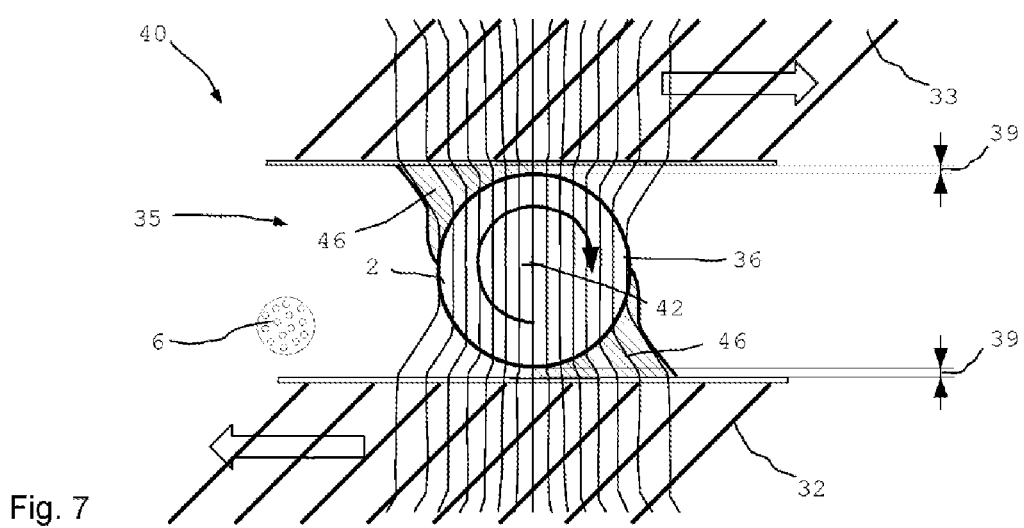
FIG. 7 shows a sectional diagrammatic sketch.

FIG. 7 shows a schematic diagrammatic sketch of the functioning of the magnetorheological transmission apparatus 40 with the basic principle of the rotary damper or of the brake device 1. This figure is basically also already shown in WO 2017/001696 A1. The relevant description and the entire content of WO 2017/001696 A1 is therefore included in the disclosure of the present invention.

FIG. 7 shows two components 32 and 33, the relative movement of which is to be dampened or targetedly influenced by the transmission apparatus 40. For this purpose, a multiplicity of rotary bodies 2 are arranged in a gap 35 between the components 32 and 33, which rotary bodies are embedded in a magnetorheological fluid 6. The rotary bodies 2 are separate parts 36 and function as magnetic field concentrators, which leads to a wedge effect during a relative movement of the components 32 and 33 with respect to one another in the presence of an applied magnetic field, wherein wedge-shaped regions 46 form in which the magnetorheological particles collect and, by means of the wedge effect, effectively brake a further rotation of the rotary bodies 2 and a relative movement of the components 32 and 33 with respect to one another.

Here, the free spacing 39 between the rotary body 2 and the surface of the components 32 and 33 is basically greater than a typical or average or maximum particle diameter of a magnetorheological particle in the magnetorheological fluid. This "MRF wedge effect" results in a considerably stronger influence than would be expected. This leads in particular to a high static force that can be utilized as a holding force.

The rotary dampers and brake device in 1 shown here in the exemplary embodiments preferably all function in accordance with this "MRF wedge effect".

Figure 8:
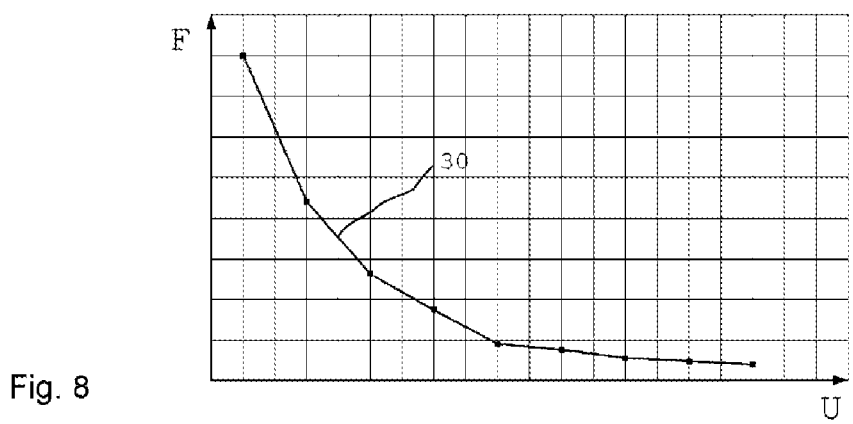
FIG. 8 shows the force profile of an apparatus according to FIG. 7.

The high static force can be effectively utilized as a holding force and can be utilized advantageously as shown in FIG. 8, which illustrates the force profile of the braking force of the magnetorheological transmission apparatus 40 or of the brake device 1 versus the rotational speed of the rotary bodies (and analogously also of the rotatable spindle unit). It can be seen that when the rotary bodies 2 are at a standstill, a very high braking force is generated. If the user overcomes the braking force that holds the door open, the braking force decreases significantly with increasing speed even if the magnetic field is still applied, such that, even if the magnetic field is applied, the user can easily close the door after overcoming the sufficient holding force.

This effect means that, in principle, a high holding force is generated in any desired angular position, which holding force can however be overcome by the user quite easily in order to close the door. A very comfortable function is thus provided. The closing function may be assisted by a motor, such that, at all times, only light forces have to be applied.

With the invention, feedback control of the drive device can be performed.

An essential aspect lies in the feedback control of the drive device 70 and/or of the brake device 1 and in the speed with which the brake device 1 can be controlled and moved or braked. In particular, the speed with which the direction can be changed.

Figure 9:
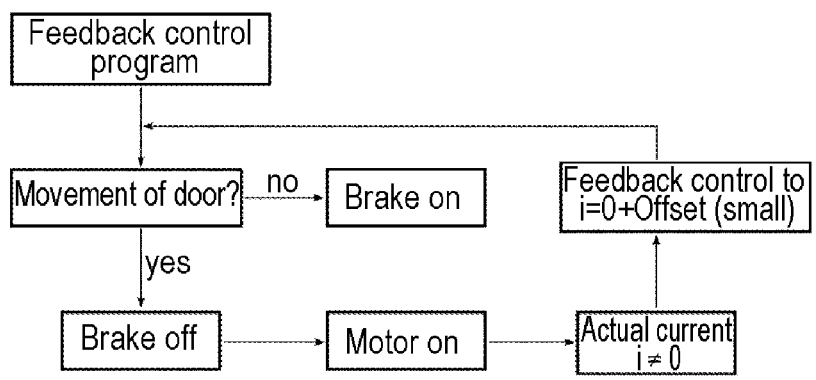
FIG. 9 shows a control diagram.
Figure 9:
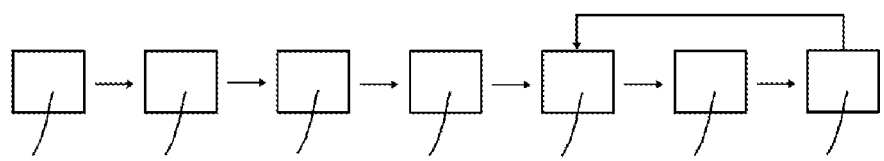
Figure 10:
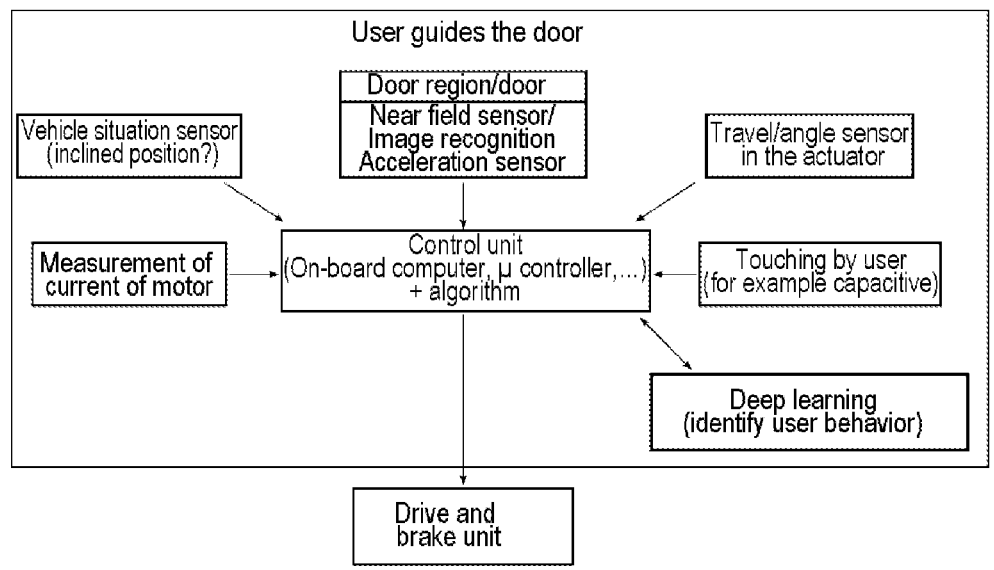
FIG. 10 shows a diagram with sensor-detected influences that can be taken into consideration.

The feedback control of the drive motor 75 is performed by way of the set current. The feedback control sequence is shown in FIG. 9.

Initial state: The door is locked or, if open, braked/blocked. If the door is moved from the outside (that is to say by the user), the brake device 1 is released and the parts move relative to one another. Owing to the resulting movement of the drive motor 75 (electric motor), a first current is induced in the drive motor, and this is measured. The control device 55 (feedback control) then actively increases the current in the opposite direction until such time as the induced current is compensated, and then outputs a small offset current above this. As a result of the offset current, the drive motor moves the door leaf 104 or the connection units 151, 152 with a small additional force for as long as the door is moved by the user. If the user changes the speed of the movement, the induced current also changes, and the proportional-integral controller 53 also performs feedback control of the current to the drive motor 75 accordingly. As a result, the force (torque) imparted by the drive motor is adapted to the change in speed of the user. If the user brakes the movement, the offset current of the drive motor 75 becomes too large, and the controller 53 reduces it through feedback control.

The control device 55 controls the door component 100. Here, a position measure 20 for an angular setting of the door leaf 104 and a speed parameter 22 for an angular speed 23 of the door leaf 104 are detected by means of a position sensor 19. The values may be recorded periodically. If a pivoting of the door or the door leaf 104 is detected, a speed parameter 22 is ascertained from the angular speed 23 (or vice versa). With the speed parameter 22, an electrical setpoint current intensity 24 for the electric drive motor 75 is determined from the table 58 stored in the memory device 57. The associated setpoint voltage 25 is subsequently set.

The associated setpoint voltage 25 is determined from empirical values. For example, base values for the friction may be ascertained in a level plane without external loads, which base values are then taken into consideration in order to achieve practically force-free guidance of the door (consideration of aging or wear).

The current intensity 26 flowing through the drive motor 75 is subsequently measured or ascertained. The current intensity 26 actually flowing is compared with the electrical setpoint current intensity 24 (in the case of the speed parameter 22).

The setpoint voltage 25 is increased if the current intensity 26 flowing through the drive motor 75 is lower than the electrical setpoint current intensity 24. It is then assumed that the user seeks to accelerate the door.

The setpoint voltage 25 is reduced if the current intensity 26 flowing through the drive motor 75 is higher than the electrical setpoint current intensity 24. It is then assumed that the user seeks to brake the door.

In particular, the spatial situation and orientation of the door to be moved are taken into consideration here. A position on a slope, in which the door has to be opened against gravity, is correspondingly taken into consideration, and the forces resulting therefrom are compensated.

The last steps are continued iteratively in order to always give the user the feeling of "force-free guidance".

The temperatures of the door and/or of the surroundings may also be taken into consideration. Different resistance forces and moments arise if the car is in the sun in summer and if the car is outdoors in winter. This also applies if the occupant stores objects such as a large drinking bottle in the door's interior paneling.

Figure 11:
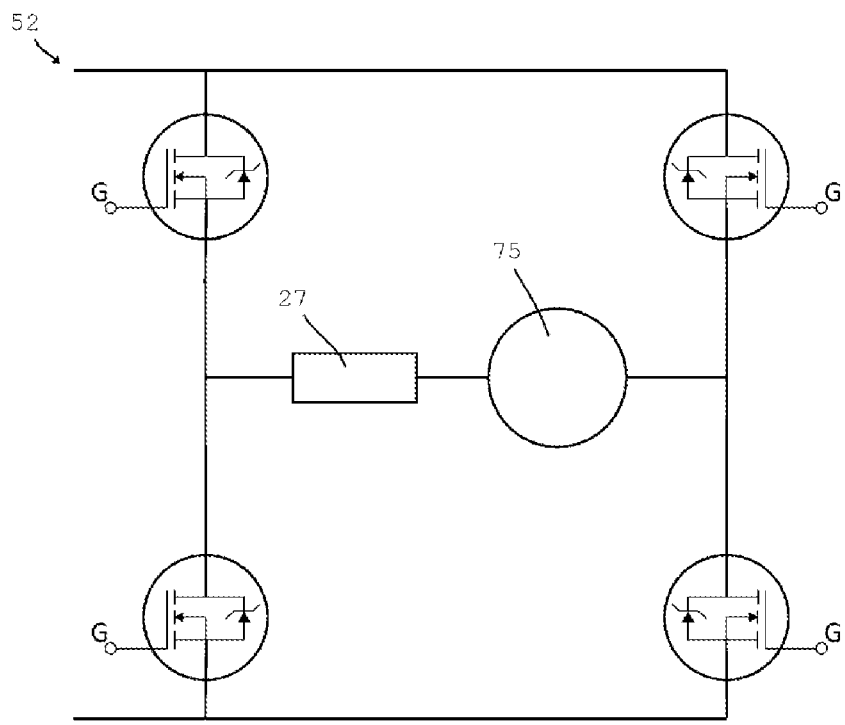
FIG. 11 shows a circuit diagram for the operation of the drive motor.

The drive motor 75 is preferably operated by way of an H-bridge 52 (FIG. 11). This circuit is used if a drive motor 75 is to be operated in both directions. If a current is induced in the drive motor 75 counter to the operating direction, this current flows via the shunt resistor 27 and is measured there by way of the voltage drop. FIG. 11 shows a circuit for operating a DC motor as a drive motor 75 in both directions. Here, the MOSFET transistors with free-wheeling diodes control the possible current direction (and the sign of the voltage) via the so-called bridge arm to which the DC motor is connected. The current can be measured at the shunt resistor 27 by way of the voltage drop. The current flows in a different direction depending on which MOSFET allows current to pass through, and in which direction. The voltage is measured across the resistor 27.

Figure 12:
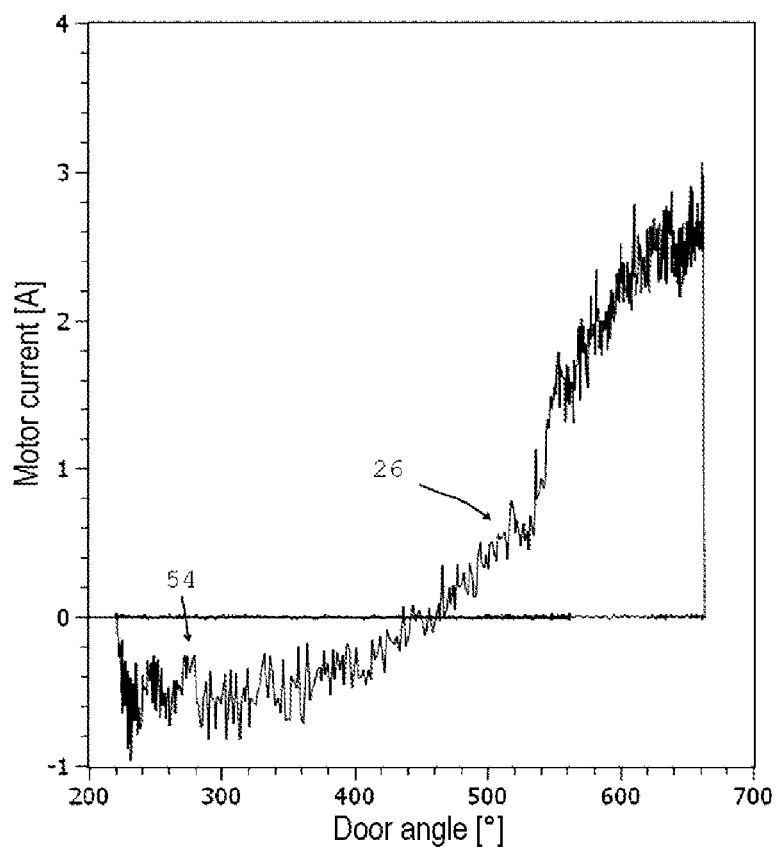
FIG. 12 shows the profile of the current intensity of the drive motor over time.
Figure 13:
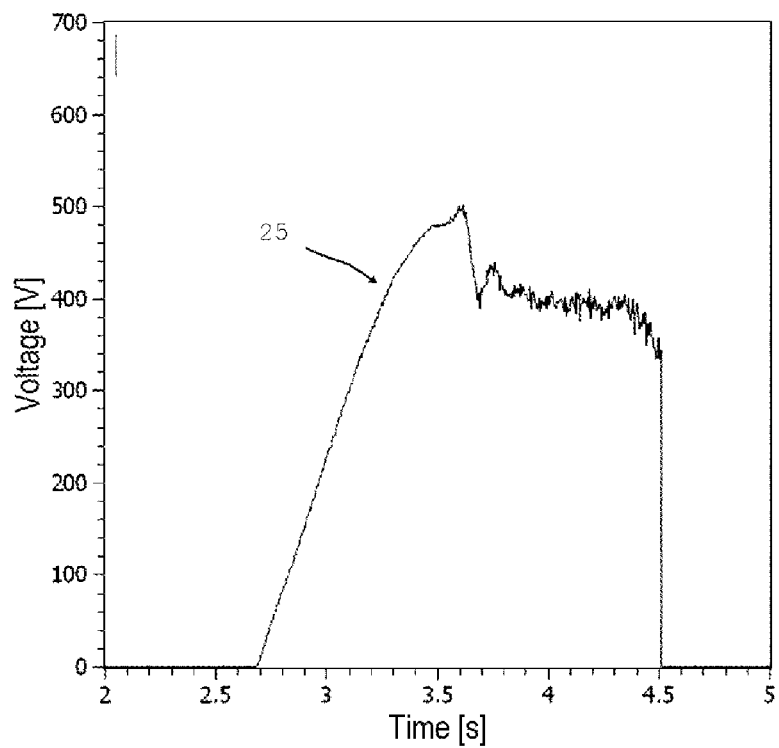
FIG. 13 shows the profile of the setpoint voltage over time.

FIGS. 12 and 13 show the profile of the voltage over time (FIG. 13) and of the current intensity versus the motor angle (FIG. 12). The end of the diagram shows the fully open state.

It can be clearly seen that the user pushes the door out of the closed state. A current is induced in the drive motor 75 by the forced movement. The voltage initially remains at 0. The control device then recognizes that the door is to be opened and readjusts the setpoint voltage 25 by feedback control such that the current intensity 26 corresponds to the setpoint current intensity 24. At the time of 4.5 seconds, full opening is reached, and the user brakes the door slightly. The system recognizes this immediately and imparts a braking action practically immediately. An extremely rapid fall with respect to time occurs. The system reacts very quickly to changes. The voltage is increased during the turning of the motor (opening of the door). Here, the voltage is increased linearly and not abruptly. If the door is no longer being accelerated by the user, the voltage is reduced again.

The profile of the motor current 26 illustrated in FIG. 12 during the door opening process in a manner dependent on the door angle shows that, at the beginning of the door opening process, a negative current flows, and the motor generates current. The controller performs feedback control of the voltage, and a current begins to flow in a positive direction, thus driving the motor.

FIG. 12 shows the current profile during the opening of the door. In the first second or the first rotation of the motor on the spindle, a current of slightly less than −1 A is induced (the motor generates current, the current flows in the opposite direction than in load operation). The controller detects the current and increases the voltage according to FIG. 12. A current then flows in the positive direction, and the drive motor 75 actively rotates conjointly, until the door is no longer being pushed by the user. The induced current is approximately ⅓ (but negative) of the current that the motor consumes during active assistance.

An angle sensor is also used in the motor or in the drive train or on the door. If a change in angle is measured, the motor activates.

In all cases, the feedback control of the variables is performed preferably by means of a PI controller 53 (proportional-integral controller). The PI controller 53 may be implemented on any processing unit, for example on a microcontroller, on the on-board computer of the vehicle, etc. This control device 55 (control unit) outputs a control signal for the drive and brake unit of the door in a manner dependent on sensor data and on a calculation algorithm.

The magnetorheological brake device 1 can assist the drive motor 75 in the braking of the door 104. The drive motor 75 then does not run down of its own accord, but is actively braked. In the standstill state, the brake device 1 imparts a braking action in order to prevent undesired movement (opening or closing) of the door. Additionally, an embarking and disembarking aid can thus be implemented by virtue of the door being held in one position by the brake device 1 or MRF brake, and the person can hold on to the door and pull themself out (disembarking aid). This is highly advantageous in tight parking spaces. The advantage of an additional brake device 1 in relation to the motor 75 is the low current consumption. If an electric motor is used for braking, it requires more current than an MRF brake. If the drive motor 75 is used for holding (blocking), high currents flow, whereby said drive motor heats up and, owing to the resulting increase in resistance in the windings, the current increases further. Very high currents then flow.

The door or the brake device is preferably equipped with at least one position sensor 19 in order to be able to determine the position and the speed of the movement of the door. The movement of the door is detected with high resolution, such that the brake device 1 can be switched/released rapidly. This is necessary if the door is intensely braked before reaching an obstruction and is then to be moved in the other direction. If the braking action does not decrease immediately, the door cannot immediately be moved in the opposite direction again. In the case of vehicle doors, which are after all relatively heavy, an abrupt braking operation immediately leads to load peaks and oscillations, which are then difficult to control. The vehicle manufacturer and the customer demand a gentle (harmonious) braking action, which is possible with the rapidly and continuously switching MRF brake device 1.

Rapid switching is also required (in the millisecond range) because lagging switching of the electric motor and/or of the brake device 1 would lead to oscillation of the door or undesired opposing movements. Here, the braking of the door preferably follows a square root function. The closer the door comes to the desired setting (for example closed), the greater the intensity with which the brakes are applied. The door is thus braked not abruptly but "gently", resulting in improved haptic feel for the user. For this purpose, it is necessary to be able to measure the exact position of the door in order to implement this function effectively.

The signal from the sensors (position sensor, angle sensor, travel sensor, acceleration sensor in the door or vehicle) is filtered by means of a filter (for example by means of a Kalman filter) in order to eliminate noise from the sensor. A resolution of 1 μm can thus be achieved in the case of a travel sensor.

The spindle used moves by 30 mm per revolution, and the resolution for the rotation of the drive motor 75 is thus 0.012°. The travel sensor is in this case seated for example on the spindle unit. A resolution of 1 micrometer in the axial direction of the spindle results in a resolution of approximately 0.012° angle of the drive motor 75. Here, there are thus more than 1000 signals per 1° change in angle of the door. A 1° rotation of the drive motor 75 corresponds to a 0.065° door opening movement. In the case of the spindle used, a 1° door opening movement corresponds to an angle of 15.38° at the drive motor 75. The accuracy in the determination of the angle of the door opening is thus <<0.1°, and for the opening of the door, there is thus an angular resolution of <0.1°, corresponding to the travel sensor. Owing to the play of the spindle units and of the drive motor 75, the resolution is higher.

A situation sensor or acceleration sensor in the door or in another region in the vehicle measures the direction of the acceleration. This allows the position of the vehicle to be inferred. If the vehicle is in an inclined position, the acceleration due to gravity points in a different direction. As a result, the control device 55 knows what force is acting on the door even if no user is moving the door.

The door may additionally be equipped with touch sensors (hand sensor 59) (resistive sensor or capacitive sensor) in order that the feedback controller of the brake device recognizes when a person touches and guides the door. It is thus possible to rule out a situation in which the door is being pushed open for example by the wind and the feedback controller interprets this as a user's hand 90 and additionally assists the movement of the door by the wind. If the car is parked in a downwardly sloping/inclined position and the door 104 is pushed open uphill, the door can thus be prevented from falling closed in an undesired manner. Conversely, an undesired opening (in particular to excessively large opening angles) is prevented if the door leaf 104 is opened downhill.

Detection of whether the wind or the user is guiding the door leaf 104 may also be performed by way of the near-field sensor system (inter alia also with image recognition). This recognizes whether or not the user is standing by the door. It is likewise possible from the movement pattern to identify what is desired. The user opens the door and usually closes it again immediately thereafter. This is a continuous process which lasts a few seconds and which is correspondingly clearly guided by the user. If the door is left open for a longer period of time, however, wind influences can be relevant.

Linking the door control unit to a weather app and/or to the GPS (position data) also assists in increasing the feedback control quality. Wind is less likely to be a disturbance variable in a parking garage than at Mount Washington. If the user always uses the same parking lot or garage, the feedback controller can learn from this using deep learning and optimize itself such that the user receives a better quality of assistance/door guidance. This also applies to the user themself (left-handed/right-handed; woman/man/child . . . ) and the habits of the user or in the case of increasing play in the components or in the event of wear. The servo assistance may also be varied intelligently. It is thus also possible at night, that is to say in a time-dependent (and/or position-dependent) manner, for the door to always be moved more slowly and quietly into the closed setting so as not to disturb or wake up family and neighbors. The same applies if children close the rear doors, in order that undesired finger trapping causes as little pain as possible. The other motivations and desires of children can also be taken into consideration in this way. It would also be possible here for a voice assistant to provide additional safety.

The user may additionally set assistance levels of different intensity on the vehicle (on-board computer or by app). It is thus possible for every user to select the intensity of assistance that they desire.

It is advantageous if the door component 100 is additionally equipped with sensors 160 distance sensors (for example ultrasonic sensors, optical sensors, inductive sensors, light barriers, camera systems, lidar, radar, etc.) in order to detect whether any obstacles are situated in front of the door. In this way, the feedback controller can force a braking operation in order to avoid damage to the vehicle itself and to other vehicles.

Sensors between the door and the car (framework) can detect when something is situated in between (for example a hand, finger, etc.), and the feedback controller transmits a signal to the brake device to stop the door.

Owing to the inertia of the door and the inevitable play of the individual components of the brake device 1, a slight oscillation of the door occurs after a desired movement. In the present invention, the rapid feedback control (kHz) and the possibility of rapidly switchable braking are utilized in order to directly utilize the inertia or the oscillation of the door again for the movement in the opposite direction. During the opening movement, the door is stopped in an opening end setting and oscillates owing to the play or softness of the components after the braking operation. The user wishes to immediately close the door again. The sensors detect when the door oscillates in the closing direction and release the brake device 1 exactly then, specifically very rapidly (single-digit millisecond range), whereby the oscillation impetus is directly utilized for the closing of the door, and thus the start-up current of the drive motor 75 (electric motor) is also reduced. If the brake device 1 were released too slowly and the door were already oscillating in the opening direction again, the electric motor would have to work against this, which requires high start-up moments/currents. In addition to the increased current consumption and component loading, this would also result in unpleasant haptic and acoustic behavior of the door. The motor "whines" in the presence of such loads, which is interpreted by the user as a poor quality feature. When the user is not moving the door, said component is held by the (MRF) brake device 1. Here, spindle unit can be preloaded by means of the drive motor 75, that is to say the motor is operated with a low current (a few mA), as a result of which it seeks to rotate the spindle unit counter to the brake device 75. When the user moves the door, the brake device 1 is released and the drive motor 75 immediately rotates conjointly with said component. The required starting time of the drive motor 75 is thus shortened and the user does not feel any dead time in the assistance from the motor.

The door may be fixed (braked) in the position desired by the user (to which the door has been guided by said user) by means of a movement pattern (for example rapid opening/closing of the door in the desired position) or a button, such that the user can hold on to said door when disembarking or embarking (disembarking/embarking aid).

Advantages of the Guided Mode:
The door can be opened easily (without excessive expenditure of force) regardless of the position in which the vehicle is situated (uphill, downhill, on an incline, counter to the wind . . . )

Ease of handling, same use as a conventional door, door handle, etc. are the same, no buttons, gestures, etc. required.

Safety: The user must always specify the movement, the door is not opened and closed independently. Sensors prevent damage resulting from collision; trapping in the door.

For as long as the user guides the door, they are responsible for the movement. Therefore, less expensive sensor technology is required for this (fewer near-field detection sensors). This is an advantage in the case of vehicles in lower price ranges.

The brake device 1 is preferably opened, during oscillating movements of the door leaf 104, at a stoppage or rotational direction reversal setting, such that lower driving forces are necessary in the case of a user-demanded movement in one direction.

In particular, the control device 55 detects whether a user is in the vicinity of the door.

In all of the configurations, it is preferred that control is possible via wired or wirelessly connected or coupled control switches or control surfaces.

Control of the door by voice input is preferably possible. For this purpose, speech recognition may be carried out (locally or remotely). The transmission of commands may likewise be performed by voice. Possible commands are for example:

"open door" or "open"
"close door" or "close"
"stop door"
"block door" (for example in the case of the disembarking aid)
"quietly close door"
"more assistance"

It is also possible to name a specific door:
"open" or "close door at the front left" etc.

In particular, the disembarking aid may have or require a dedicated button for activation. This may be disadvantageous (where should it be placed, cable connection, etc.). It is easy and inexpensive to implement using a voice command.

It may be possible and necessary that a voice command has to be confirmed before it is executed. The execution may also be denied, for example during travel.

A microphone is preferably installed.

Additionally, the following possibilities for the implementation of doors of motor vehicles may be realized:

1. Active doors. This means that the door moves actively, in a manner driven by an electric motor, at the push of a button or as a result of some other control command, and is braked by means of a brake. All of this is realized without external intervention. Sensors detect necessary stop positions.
2. Passively implemented doors. The door is moved by the user and is itself passive (and is braked to a maximum degree). By means of sensors, intelligent damping can be performed, and, for example, stopping before an obstruction is reached is possible.
3. Passive "active" door: The electric motor etc. is disengaged and the otherwise active door can be moved passively with low and in any case reasonable expenditure of force.

A new possibility is the semi-active door described here:
The door is moved by the user as in the previous mode 2 (passive), but the electric motor in combination with the brake assists the movement. The door can thus be moved as desired, for example using one finger. For as long as the finger (hand) guides the door, the door follows the hand movement or the specification of the user with minimal opposing force. The force with which the door follows may be preset (for example in the vehicle settings menu; or in the ignition key; in an app. etc.). The door may also be gently nudged and then moves very slowly, in order to be stopped again using one finger. The person "guides" the door, and the door does (preferably) nothing (or almost nothing) independently. The trick here is to guess the user demand (sensor . . . ) and to perform feedback control of the motor such that the door does not perform any movements that are "unnatural" (jerking, excessive deceleration, being too sluggish; changes in direction of rotation are critical . . . ).

This is also possible in the inclined position. The electric motor then compensates for the changing forces (otherwise the door would move more freely in one direction and more sluggishly in the other). The door always moves in the same "elegant" or virtually gravity-free manner.

The door may be fixed (braked) in the position desired by the user (to which the movable component has been guided by said user) by means of a movement pattern or a button, such that the user can hold on to said door when disembarking or embarking (disembarking/embarking aid).

Another advantage of this solution is that the disengagement could be dispensed with. This is a great advantage in terms of cost, weight and installation space.

It is advantageous if a user can passively close a car door. This is particularly advantageous if a low closing force is required.

The door then does not open "by itself", but is guided with minimal expenditure of force. The drive motor provides the assistance and the brake device imparts a braking action in an adapted manner as required, such that a minimal force is required at all times.

The electric motor together with gearbox should be relatively strong, as the forces on the door and movement speeds are high (disembarking aid: up to 2000 N; actuating force up to 1000 N). It is therefore possible that the motor together with gearbox are audible (as in the case of the electric tailgate), which is undesired. Gearboxes with plastics gearwheels and an encapsulation in the form of sound insulation remedy this only to a limited extent.

In most vehicles, a loudspeaker is also arranged in the door. This is usually situated only a few centimeters away from the active door adjuster (=drive motor). Antinoise can then be emitted by means of the loudspeaker when the door adjuster is active. The noise of the door adjuster does not vary greatly in terms of the frequency spectrum. Furthermore, if the door adjuster is activated, one knows what it is doing or is intended to do. It is not an undefined noise source. The load is known from the sensor signals (for example yaw sensor: inclined position of the vehicle). Antinoise can thus be used very efficiently.

In all configurations, the drive motor 75 may also be a synchronous motor, asynchronous motor, disk rotor, ultrasonic motor, piezo motor or axial gap motor, with or without a gearbox 74, without being restricted to these.

The drive motor may in particular be operated with 12, 24 or 48 volts.

The gearbox 74 may be a planetary gearbox, conventional gearbox, harmonic drive (strain wave gearing) or CVT, without being restricted to these. The transmission elements (such as the gearwheel) may in this case be composed of steel, plastic, fiber-reinforced materials, non-ferrous metals or the like.

LIST OF REFERENCE DESIGNATIONS

| | |
|---|---|
| 1 | Brake device |
| 2 | Rotary bodies, rolling bodies |
| 3 | Rotary mount, axle unit, coupling rod |
| 4 | Spindle unit, threaded spindle |
| 5 | Spindle unit, spindle nut |
| 6 | Magnetorheological fluid |
| 7 | Bearing |
| 8 | Magnetic field source |
| 9 | Electrical coil |
| 10 | Magnetic field |
| 11 | Coil holder |
| 12 | Threaded nut |
| 13 | Seal |
| 14 | External thread |
| 15 | Internal thread |
| 16 | Holed nut |
| 17 | Sleeve |
| 18 | Intermediate ring |
| 19 | Position sensor, setting sensor |
| 20 | Position measure |
| 21 | Channel |
| 22 | Speed parameter |
| 23 | Angular speed, movement speed |
| 24 | Setpoint current intensity |
| 25 | Setpoint voltage |
| 26 | Current intensity |
| 27 | Resistance |
| 28 | Race |
| 29 | Cable |
| 30 | Force profile |
| 32 | Component |
| 32a | Guide plate |
| 32b | Detail |
| 33 | Component |
| 34 | Component |
| 34a | Pivot axis |
| 35 | Gap |
| 36 | Separate part |
| 39 | Free spacing |
| 40 | Transmission apparatus |
| 42 | Axis of rotation |
| 46 | Wedge shape |
| 50 | Movement influencing device, apparatus |
| 51 | Travel sensor |
| 52 | H-bridge |
| 53 | PI controller |
| 54 | Induced electrical variable |
| 55 | Control device |
| 56 | Comparison device |
| 57 | Memory device |
| 58 | Table |
| 59 | Hand sensor |
| 60 | Sensor device |
| 61 | Angle (of the door) |
| 62 | Situation sensor |
| 63 | GPS sensor |
| 64 | Tilt sensor |
| 65 | Current sensor |
| 70 | Drive device |
| 71 | Drive housing |
| 72 | Drive shaft |
| 73 | Drive mount |
| 74 | Transmission |
| 75 | Drive motor |
| 76 | Driver |
| 80 | Actuator |
| 81 | Preload unit |
| 86 | Drive |
| 90 | Hand |
| 100 | Door component |
| 102 | Closed setting |
| 103 | Open setting |
| 104 | Door component |
| 151 | Connection unit |
| 151a | Screw |
| 152 | Connection unit |
| 152a | Pivot axis |
| 153 | Coupling profile |
| 153d | Curvature |
| 153e | Curvature |
| 154 | Door device |

-continued

| | |
|---|---|
| 160 | Sensor |
| 200 | Motor vehicle |

The invention claimed is:

1. A method for pivoting a movable door leaf of a door component for a motor vehicle, the door component having a drive with an electric drive motor for influencing a pivoting of the door leaf between a closed setting and an open setting, the method comprising:
    detecting with a position sensor a position measure for an angular setting of the door leaf and a speed parameter for an angular speed of the door leaf;
    during the pivoting of the door leaf with the speed parameter, ascertaining an electrical setpoint current intensity for the electric drive motor and setting an associated setpoint voltage;
    subsequently ascertaining a current intensity flowing through the drive motor; and
    if the current intensity flowing through the drive motor is lower than the electrical setpoint current intensity, increasing the setpoint voltage, or
    if the current intensity flowing through the drive motor is greater than the electrical setpoint current intensity, reducing the setpoint voltage.

2. The method according to claim 1, further comprising detecting the current intensity flowing through the drive motor by way of a resistor connected in series with the drive motor.

3. The method according to claim 1, wherein the drive motor is arranged in an H-bridge.

4. The method according to claim 1, further comprising performing feedback control of the setpoint voltage by a proportional-integral controller.

5. The method according to claim 1, further comprising taking the position measure into consideration in the step of ascertaining the electrical setpoint current intensity and/or an electrical setpoint voltage.

6. The method according to claim 1, further comprising using a situation sensor to detect at least one value for a spatial orientation of the motor vehicle, and using a current sensor to ascertain a value for a current intensity of the drive, and wherein the position measure is taken into consideration in the ascertainment of the electrical setpoint current intensity and/or of an electrical setpoint voltage.

7. The method according to claim 1, further comprising taking into consideration at least one of a horizontal orientation of the motor vehicle or a signal of a global positioning system ("GPs") sensor.

8. The method according to claim 1, further comprising ascertaining a measure for an internal resistance to movement and performing a recalibration using the measure for the internal resistance to movement.

9. The method according to claim 1, further comprising performing hand detection for a presence of a hand with a hand sensor, and activating the drive only if a hand of a user is detected in an immediate vicinity of the door leaf.

10. A method for pivoting a movable door leaf of a door component of a motor vehicle by a drive having an electric drive motor for influencing a pivoting of the door leaf by a user, the method comprising:
    detecting, with a position sensor, a position value for an angular setting of the door leaf;
    detecting, with a situation sensor, at least one value for a spatial orientation of the motor vehicle;
    ascertaining, with a current sensor, a value for a current intensity of the drive; and
    during the pivoting of the door leaf, controlling the drive with a control device using the position value or special orientation value and correction values stored in a table containing correction values.

11. The method according to claim 10, further comprising supplementing the drive by a fast-switching brake device and using a control device to control an interaction between the drive and the brake device.

12. The method according to claim 10, further comprising enabling a user to preselect movement forces in a vehicle menu.

13. The method according to claim 10, further comprising, during a pivoting of the door leaf, detecting at least one electrical variable of the electric drive motor by way of a sensor device and taking the at least one electrical variable into account for controlling the electric drive motor,
    thereby, on occasion of an manually initiated and/or changed pivoting of the door leaf, detecting the electrical variable induced in the drive motor and subsequently controlling the drive motor actively in accordance with the electrical variable.

14. A door component for a vehicle, the door component comprising:
    a drive with an electric drive motor;
    two connection units being movable relative to one another and being adjustable relative to one another by way of said drive motor;
    one of said two connection units being connectable to a support structure and another of said two connection units being connectable to a movable door leaf in order to influence a movement of the door leaf between a closed setting and an open setting;
    a position sensor configured for detecting a position measure for a setting of said two connection units relative to one another and a speed parameter for a movement speed of said two connection units relative to one another;
    at least one sensor device assigned to said electric drive motor for detecting at least a current intensity of a current flowing through said drive motor;
    a control device configured, during a pivoting of the door leaf with the speed parameter, to ascertain an electrical setpoint current intensity for the electric drive motor and to set an associated setpoint voltage;
    said control device being configured to ascertain the current intensity of the current flowing through said drive motor in a presence of the setpoint voltage by way of said sensor device;
    a comparator configured to compare the current intensity of the current flowing through said drive motor with the setpoint current intensity; and
    said control device being configured to increase the setpoint voltage if the current intensity of the current flowing through said drive motor is lower than the electrical setpoint current intensity and to reduce the setpoint voltage if the current intensity of the current flowing through said drive motor is higher than the electrical setpoint current intensity.

15. The door component according to claim 14, wherein said sensor is configured to detect the current intensity of the drive motor when the position measure for an angular setting of the door leaf changes.

16. The door component according to claim 14, wherein said control device includes a memory having stored therein at least one table with correction values.

17. The door component according to claim 14, further comprising a controllable brake device, said brake device being a magnetorheological transmission apparatus having at least one electrical coil.

18. The door component according to claim 14, further comprising a hand sensor configured to detect a touching of the door leaf by a hand of a user, said hand sensor comprising at least one of a near field sensor or a capacitive sensor.

19. The door component according to claim 14, further comprising an image recognition system configured for dynamically detecting a near field in a surrounding of the door.

20. The door component according to claim 14, further comprising a coupling profile mechanically connecting the other of said two connection units to said door leaf, said coupling profile being mounted in articulated fashion on both sides and having a shape to ensure that said coupling profile remains situated centrally in a cutout that is rigidly connected to the support structure despite changing kinematic conditions during the movement of the door leaf owing to the mutually spaced-apart connection points or door panel pivot points and the fastening points of said drive unit.

* * * * *